(12) United States Patent
Jordan et al.

(10) Patent No.: US 7,064,703 B2
(45) Date of Patent: Jun. 20, 2006

(54) METHODS AND APPARATUS FOR RANDOMLY MODULATING RADAR ALTIMETERS

(75) Inventors: Lavell Jordan, San Marcos, TX (US); James R. Hager, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 46 days.

(21) Appl. No.: 10/780,411

(22) Filed: Feb. 17, 2004

(65) Prior Publication Data

US 2005/0179583 A1  Aug. 18, 2005

(51) Int. Cl.
*G01S 13/08* (2006.01)
(52) U.S. Cl. .............. 342/120; 342/123; 342/132; 342/134; 342/135
(58) Field of Classification Search ........ 342/120–123, 342/131, 132, 134, 135, 195, 200–205
See application file for complete search history.

(56) References Cited

U.S. PATENT DOCUMENTS

| | | | | |
|---|---|---|---|---|
| 2,810,905 A | * | 10/1957 | Barlow ................... 342/371 |
| 3,109,172 A | * | 10/1963 | Hardinger et al. ........... 342/87 |
| 3,774,206 A | * | 11/1973 | Rauch ..................... 342/89 |
| 4,143,263 A | * | 3/1979 | Eichweber ................ 398/170 |
| 4,194,204 A | | 3/1980 | Alpers |
| 4,299,484 A | | 11/1981 | Holzapfel |
| 4,429,310 A | * | 1/1984 | Zscheile et al. ........... 342/135 |
| 4,600,889 A | | 7/1986 | Rugen |
| 4,757,450 A | * | 7/1988 | Etoh ..................... 701/96 |
| 4,758,839 A | | 7/1988 | Goebel et al. |
| 4,851,852 A | | 7/1989 | Bjorke et al. |
| 4,959,654 A | | 9/1990 | Bjorke et al. |
| 4,973,967 A | * | 11/1990 | David et al. ............. 342/122 |
| 5,497,160 A | * | 3/1996 | Koehler et al. ........... 342/145 |
| 5,680,139 A | * | 10/1997 | Huguenin et al. ......... 342/175 |
| 5,712,640 A | * | 1/1998 | Andou et al. .............. 342/70 |
| 5,731,781 A | * | 3/1998 | Reed ..................... 342/135 |
| 5,731,782 A | | 3/1998 | Walls |
| 5,790,067 A | | 8/1998 | Van Ommeren et al. |
| 5,841,393 A | | 11/1998 | Saito et al. |

(Continued)

FOREIGN PATENT DOCUMENTS

FR   2599154 A1 * 11/1987

OTHER PUBLICATIONS

"Multibeam radar altimetry: spaceborne feasibility", Miller, L.S.; Brown, G.S.; Choy, L.W.; Geoscience and Remote Sensing, IEEE Trans on vol. 29, Issue 3, May 1991 Ps:465-469.*

(Continued)

*Primary Examiner*—John B. Sotomayor
(74) *Attorney, Agent, or Firm*—Dina Khaled, Esq.; Armstrong Teasdale LLP

(57) ABSTRACT

A method for randomly phase modulating a radar altimeter is described. The method includes momentarily applying a signal from a random noise source to an amplifier, applying an output of the amplifier to a voltage controlled oscillator (VCO), applying an output of the VCO to a transmitter and mixer of the radar altimeter to modulate transmissions of the radar altimeter and to demodulate reflected radar transmissions received by the radar altimeter and holding the output of the amplifier constant from before a radar altimeter transmission until after reception of the reflected radar signals from that transmission by the radar altimeter. The method further includes repeating the applying steps and the holding step.

25 Claims, 3 Drawing Sheets

U.S. PATENT DOCUMENTS

| | | | |
|---|---|---|---|
| 6,034,642 A * | 3/2000 | Kojima et al. | 343/753 |
| 6,037,894 A * | 3/2000 | Pfizenmaier et al. | 342/70 |
| 6,081,221 A | 6/2000 | Zrnic et al. | |
| 6,211,812 B1 | 4/2001 | Chiles et al. | |
| 6,225,943 B1 * | 5/2001 | Curley et al. | 342/137 |
| 6,278,397 B1 * | 8/2001 | Chiles et al. | 342/120 |
| 6,407,697 B1 | 6/2002 | Hager et al. | |
| 6,628,228 B1 | 9/2003 | Matich et al. | |
| 6,700,529 B1 * | 3/2004 | Matsuura | 342/70 |
| 6,977,611 B1 * | 12/2005 | Crabb | 342/122 |
| 2005/0179583 A1 * | 8/2005 | Jordan et al. | 342/120 |

OTHER PUBLICATIONS

International Search Report dated Sep. 30, 2005, Application No. PCT/US 2005/004938, 13 pages.

* cited by examiner

Frequency Spectrum

METHODS AND APPARATUS FOR RANDOMLY MODULATING RADAR ALTIMETERS

BACKGROUND OF THE INVENTION

This invention relates generally to modulation techniques for radar, and more specifically to a radar altimeter which incorporates random noise modulation techniques.

A radar altimeter transmits pulses of radar energy and determines ranging information by measuring a delay time from transmission of the radar energy to receipt of an echo signal (the reflected pulses of radar energy). In known radar altimeters, to provide a continuous wave transmission capability, the transmitted radar signal is modulated and the delay in modulation is measured. For example, a frequency shift of the modulated, reflected pulses of radar energy is measured in order to obtain range information.

In military operations, reception of the transmitted radar signal not only provides an enemy with information concerning the existence of a source of a transmitted signal but also may include enough information to enable the enemy to provide false information to a radar altimeter. One such example is in the form of imitation echo signals. Imitation echo signals can be utilized, in one example, to cause a radar altimeter to provide an incorrect altitude. For this reason, various methods are used to reduce the power output of radar altimeters and to introduce pseudo-random noise (PRN) patterns to the radar-transmitted signal. One of the problems with pseudo-randomly modulated radar transmission signals is that the echo signals no longer fall within a very narrow frequency range, making a radar receiver that is designed only for receiving signals at a desired frequency to be used. In order to eliminate spurious signals from outside the very narrow frequency range, elaborate filtering techniques have been developed. When utilizing such techniques, the transmitted signal has to have sufficient amplitude to overcome problems caused by any spurious signals that are also being received.

Some known pulse Doppler radar altimeters incorporate bi-phase modulation techniques such as a pseudo-random noise (PRN) code which results in a finite code repeat interval. A finite code repeat interval provides predictable spectral line frequencies. One problem associated with predictable spectral line frequencies is that intercepting receivers (e.g., an enemy radar) can automatically search and acquire the transmit energy, detect a location, and jam the radar altimeter. The immunity to interception and jamming from such bi-phase modulation techniques realized by these altimeters is a direct function of the code word (PRN code) length. The transmitted signal is spread over a number of spectrum lines as a result of the PRN code. A 31 bit code word, for example, provides an intercept disadvantage in that the radar transmitted signal strength at the carrier frequency is reduced by the factor, 1/31, when compared with a radar altimeter that does not employ the PRN code. A received continuous wave jamming signal is spread over a number of spectrum lines. Therefore, an increase in jammer signal strength of 31 times is needed to jam the radar signal when compared with a radar altimeter that does not employ the PRN code.

The bandwidth of the radar PRN receiver should be narrow enough to integrate a period of time at least equal to the word length. The longer the modulation word for improved covertness and jam immunity, the narrower the bandwidth. Unfortunately, the receiver bandwidth has to be wide enough to process the Doppler shift caused by the platform velocity, resulting in a finite limit on the word length and accordingly on the level of covertness and jam immunity.

BRIEF SUMMARY OF THE INVENTION

In one aspect, a method for randomly phase modulating a radar altimeter is provided. The method comprises momentarily applying a signal from a random noise source to an amplifier, applying an output of the amplifier to a voltage controlled oscillator (VCO), applying an output of the VCO to a transmitter and mixer of the radar altimeter to modulate transmissions of the radar altimeter and to demodulate reflected radar transmissions received by the radar altimeter, and holding the output of the amplifier constant from before a radar altimeter transmission until after reception of the reflected radar signals from that transmission by the radar altimeter. The method also comprises repeating the applying steps and the holding step.

In another aspect, a method for randomly phase modulating a radar altimeter which includes a VCO having an output which modulates transmissions of the radar altimeter and demodulates reflected radar transmissions received by the radar altimeter is provided. The method comprises configuring the VCO to provide a random phase modulation source and holding the phase of the modulation source substantially constant from a time when the radar altimeter transmits a radar signal until a time when a reflection of the transmitted radar signal is received by the radar altimeter.

In still another aspect, a radar altimeter is provided which comprises a VCO for modulating transmissions of the radar altimeter and demodulating reflected radar transmissions received by the radar altimeter. The radar altimeter also comprises a random noise source, a holding circuit configured to sample a voltage from the random noise source and hold the voltage constant at an input to the VCO from the time a signal is transmitted by the radar altimeter until a reflected radar return signal is demodulated by the radar altimeter.

In yet another aspect, a circuit for randomly phase modulating transmissions of a radar altimeter and demodulating reflected radar transmissions received by the radar altimeter is provided. The radar altimeter includes a VCO and the circuit is connected to an input of the VCO. The circuit comprises a random noise source, an amplifier comprising an input and further comprising an output connected to the VCO, and a switch. The switch is between the random noise source and the input of the amplifier. The switch is configured to be open from the time a signal is transmitted by the radar altimeter until a reflected radar return signal is demodulated by the radar altimeter.

DETAILED DESCRIPTION OF THE INVENTION

The below described apparatus and methods incorporate random phase modulation into a radar altimeter while also providing an infinite phase resolution resulting in no code repeat intervals. Known pseudo-random noise (PRN) modulation systems incorporate bi-phase non-random modulation, for example, of either 0 or 180 degrees. The phase resolution methods described herein result in an infinite word length, and therefore provide greatly improved covertness and jam immunity over known radar altimeters. In addition, since a bandwidth of the radar receiver is narrow enough to integrate the period of time between individual radar pulses, as opposed to integrating the period of time between entire words, the level of covertness and jam immunity is not affected by platform Doppler velocity as are known radar altimeter systems.

Figure 1:
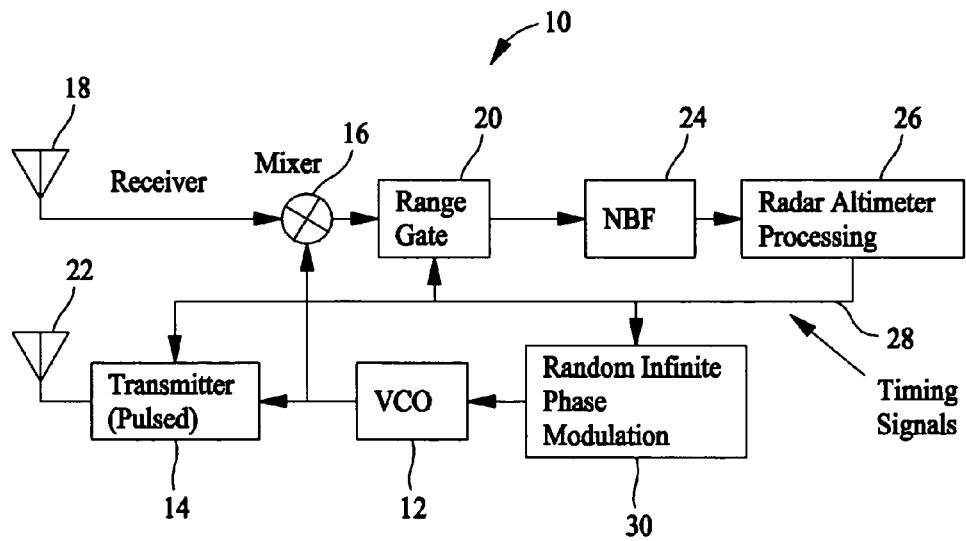
FIG. 1 is a block diagram of a radar altimeter which incorporates a random phase modulation source.

Referring to FIG. 1, a simplified block diagram of a radar altimeter 10 includes a phase modulated voltage controlled oscillator (VCO) 12 providing a frequency source for a radar transmitter 14 and a mixer 16. Mixer 16 demodulates the signals received at receive antenna 18 with the frequency from VCO 12 to provide a radar return signal at a Doppler frequency to range gate 20.

Mixer 16 down converts received radar signals to a base band frequency. Such a down conversion is part of a processing sequence for a radar return signal received by radar altimeter 10, and is sometimes referred to as decimation to a base band frequency. For example, in known radar altimeters, down conversion to base band frequency is normally accomplished in a processor by sampling the radar return signal at a period of length that is an integer multiple of the period of the return signal. In some altimeters, the base band frequency is referred to as a Doppler frequency, as the base band frequency is the result of a Doppler shift in the received radar signal.

Range gate 20 is configured to pass the Doppler frequency signal at a set time after a transmission from radar transmitter 14 through transmit antenna 22. The set time is dependent on a range to a target. The Doppler frequency signal is then is sampled at narrow band filter 24, and processed at radar processor 26 in order to generate radar data that can be utilized by other systems or displayed, for example, on an aircraft display (not shown). Radar processor 26 further generates timing signals 28 which are utilized to control passage of the Doppler frequency signals through range gate 20. Radar processor 26 also provides timing signals to radar transmitter 14 to enable transmission of radar signals through transmit antenna 22.

VCO 12 receives a modulation signal (e.g., a voltage) from a random phase modulation source 30 and switching of the modulation signal from random phase modulation source 30 is also controlled by timing signals from radar processor 28. The phase modulation initiated by random phase modulation source 30 is not bi-phase, but is a random phase relation which results in an infinite phase resolution. In one embodiment, the phase from random phase modulation source 30 is held constant from the time transmitter 14 transmits pulses of RF energy (e.g., the radar signal) towards the ground through transmit antenna 22 until the time the reflected radar signal is received and processed through mixer 16. Holding the phase constant from the time of transmission to the time of reception of the range delayed radar return allows proper demodulation which then results in an in-phase signal for filtering and eventual processing at the output of mixer 16.

Figure 2:
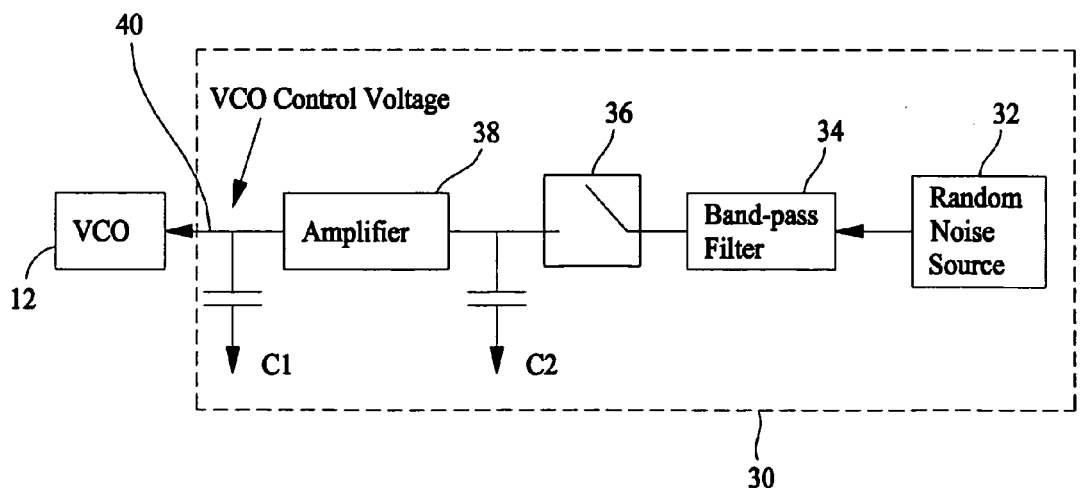
FIG. 2 is a block diagram of the random phase modulation source of FIG. 1.

As described above, modulation of VCO 12 is provided by random phase modulation source 30. FIG. 2 is a block diagram of random phase modulation source 30. Random phase modulation source 30 includes, in the embodiment shown, a random noise source 32 whose output is received by a band pass filter 34. The output of band pass filter 34 is switched through switch 36 to an input of amplifier 38. An output of amplifier 38 is the VCO control voltage 40 that is input into VCO 12, as described above.

Switch 36 is open from a beginning of a radar transmission until the reflected radar return signal is received at mixer 16 (shown in FIG. 1). Operation of switch 36 in random phase modulation source 30 provides coherent operation of radar altimeter 10 (shown in FIG. 1) from pulse-to-pulse. Switch 36 is then closed for a sufficient time to randomly phase modulate VCO 12. Capacitor C1 provides additional filtering for VCO control voltage 40. Capacitor C2 is utilized to hold the voltage at the input of amplifier 38 constant during the time that switch 36 is open. Band-pass filter 34 is used to control the random noise frequency spectrum. For example, low frequencies being applied to the input of amplifier 38 could change a center frequency of VCO 12. Combinations of switch 36, amplifier 38, and capacitors C1 and C2 provide a hold device that is configured to hold a voltage applied to VCO 12 until the radar return signal has been received at antenna 18 and phase demodulated by mixer 16.

In one embodiment, random noise source 32 includes a noise diode and an amplifier. A noise diode is a solid state noise source where a voltage potential applied to the noise diode results in an excess noise ratio from the noise diode. In another embodiment, random noise source 32 includes a high ohm resistor (i.e., in excess of one megohm) connected to an input of a high gain (>1000) amplifier. The values for the resistor and gain for the amplifier are typical values and produce about 12 milli-volts RMS noise in a 1.0 MHz bandwidth for input into band pass filter 34. 12 milli-volts RMS noise is representative of an input level to specific voltage controlled oscillators. Other resistor values and amplifier gains can be utilized in conjunction with other voltage controlled oscillators. Thermal noise produced by the resistor provides a random noise voltage.

Other embodiments for random phase modulation source 30 also exist. For example, by removing switch 36 and connecting the output of band pass filter 34 to an input of amplifier 38, and adjusting band-pass filter 34 to provide an almost constant VCO phase during a given pulse repetition interval of radar altimeter 10. Another method of achieving random phase modulation of radar altimeter 10 is to remove DC power (not shown) from VCO 12 for a sufficient time for the VCO output signal supplied to mixer 16 and transmitter 14 (both shown in FIG. 1) to decay. When DC power is restored to VCO 12, a phase of VCO 12 is determined by thermal noise generated within an amplifier that is internal to VCO 12.

Still another method for achieving random phase modulation includes biasing the amplifier internal to VCO 12 to an off condition after receiving radar return signal at mixer 16. By applying an impulse voltage to the amplifier internal to VCO 12 or applying an impulse voltage to a frequency determining resonant circuit random phase modulation can be attained. However, in such an embodiment, timing of the impulse voltage cannot be derived from a frequency of VCO 12. Specifically, a timing of the impulse is random with respect to a phase of VCO 12.

In known systems which utilize bi-phase coded modulation, the filter (similar to narrow band filter 24 shown in FIG.

Figure 4:
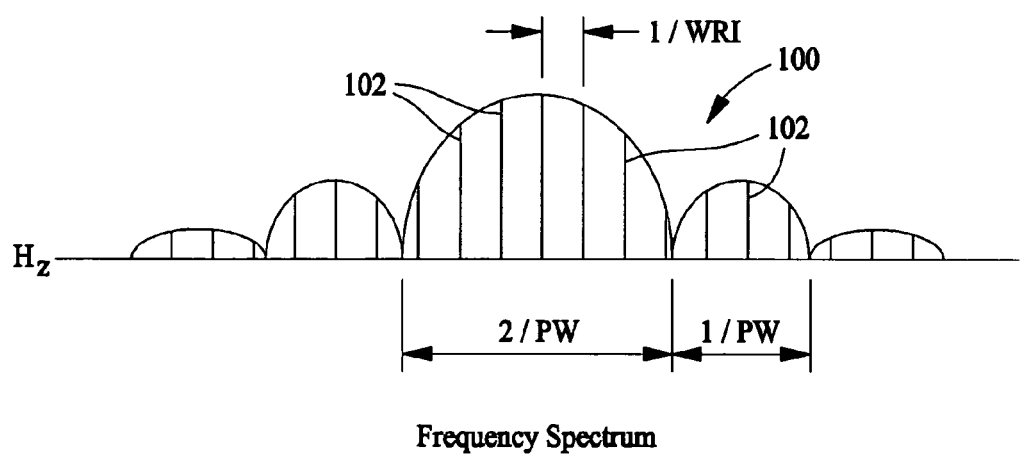
FIG. 4 illustrates a frequency spectrum for a radar altimeter modulated with bi-phase non-random modulation.

1) is set to a bandwidth, B, which is equal to or less than the reciprocal of a word repetition interval (WRI) or, $B \leq 1/WRI$ for the bi-phase coded modulation. The restriction on bandwidth, as described further below with respect to FIG. 4, provides the result that the filter passes only a carrier frequency Doppler signal and rejects range side-lobes spaced at 1/WRI intervals from the carrier frequency. As described below with respect to FIG. 6, random phase modulation source 30 allows the bandwidth of filter 24 to be increased to be equal to or less than the reciprocal of a pulse repetition interval (PRI) or, $B \leq 1/PRI$. This increase in bandwidth of filter 24 reduces the Doppler bandwidth restriction associated with present PRN modulated radar altimeters. The radar return signal received at receive antenna 24 and forwarded to mixer 16 is demodulated by mixer 16 resulting in a pulse train of equal phase. In one embodiment, filter 24 integrates the pulse train to a continuous wave signal which is processed by radar processor 26 utilizing normal radar altimeter processing algorithms.

Figure 3:
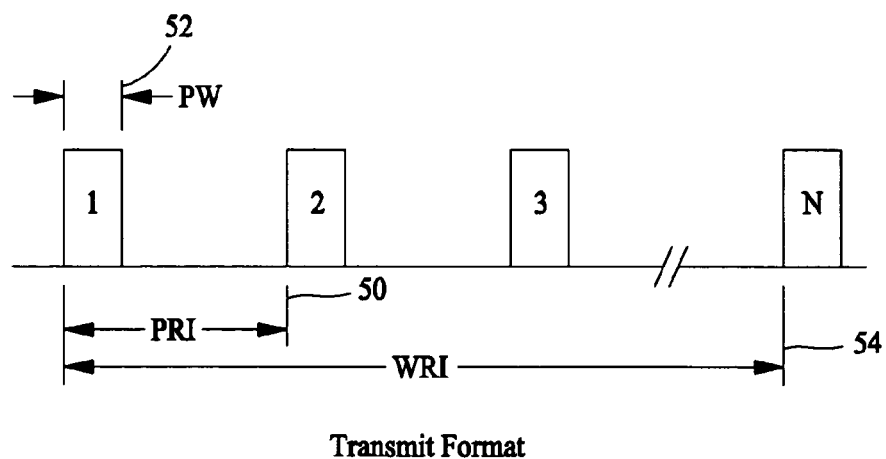
FIG. 3 illustrates a pulse repetition interval contrasted against a word repetition interval.

FIG. 3 illustrates a pulse repetition interval 50 and a pulse width 52 which are contrasted against a word repetition interval 54, which, as described above, is utilized in known bi-phase non-random modulation. As pulse repetition interval 50 has a shorter time of transmission than word repetition interval 54, the bandwidth of a filter (e.g., filter 24) is increased accordingly according to, $B \leq 1/PRI$ as opposed to, $B \leq 1/WRI$.

FIG. 4 illustrates a transmitted PRN spectrum 100 for a radar altimeter which utilizes bi-phase non-random modulation at a word repetition interval (WRI). Such modulation results in spectral line spacing, or a spectral width, that is about the reciprocal of the word repetition interval, or about 1/WRI. The spectral line spacing is sometimes referred to as pseudo-random noise word lines 102. As described above, bandwidth of a band pass filter is restricted to pass only a carrier frequency Doppler signal and to reject range side-lobes spaced at 1/WRI intervals from the carrier frequency.

Figure 5:
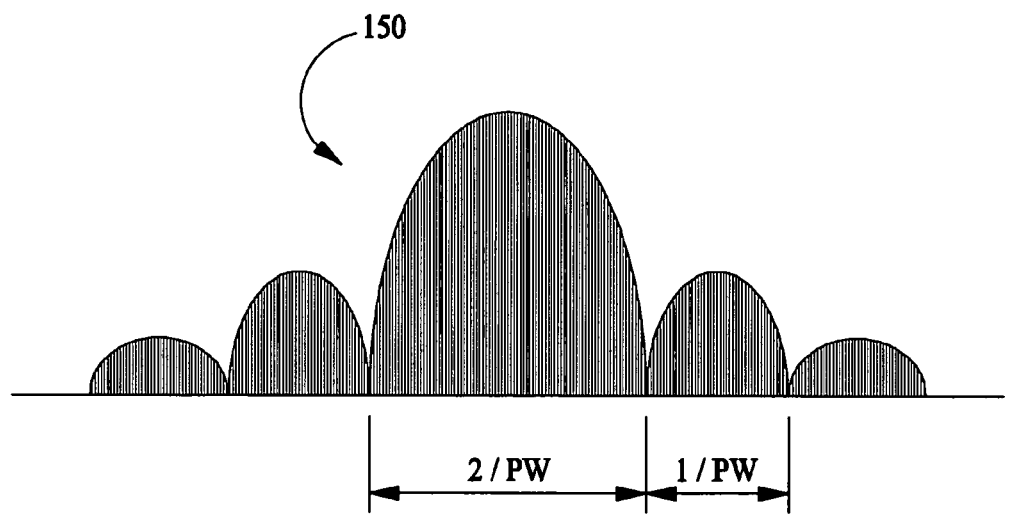
FIG. 5 illustrates a frequency spectrum for a randomly modulated radar altimeter of FIG. 1.

FIG. 5 illustrates a transmitted random noise spectrum 150 for random noise modulated radar altimeter 10 (shown in FIG. 1). Noise spectrum 150 has a sin (x)/x spectral width of about the reciprocal of pulse width, or about 1/PW. Referring to the transmitted random phase modulation described herein, there are no repeated, evenly spaced transmitted spectral lines as there is no repetition of the modulation words. The sin x/x amplitude envelope in both the bi-phase non-random modulation of known systems and the random phase modulation described herein, is shown, which is the energy content of the transmitted spectrum.

Figure 6:
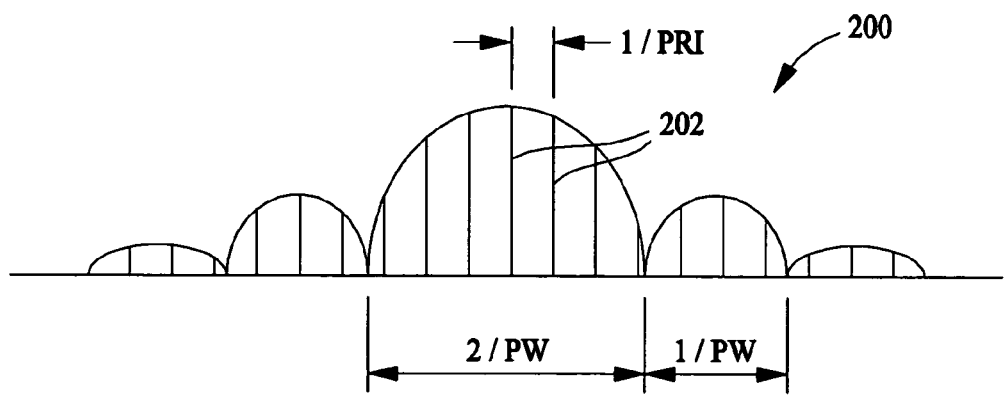
FIG. 6 illustrates the received signal spectrum after coherent demodulation by a mixer within the radar altimeter of FIG. 1.

FIG. 6 illustrates a received signal spectrum 200 for randomly modulated radar altimeter 10 (shown in FIG. 1) after coherent demodulation by mixer 16 (shown in FIG. 1). Spectrum lines 202 occur with a spacing of 1/PRI, rather than with a spacing of 1/WRI (as shown in FIG. 4) as in PRN modulated radar altimeters. As described above, random phase modulation source 30 allows the bandwidth of filter 24 to be increased to be equal to or less than the reciprocal of a pulse repetition interval (PRI) or, $B \leq 1/PRI$. This increase in bandwidth of filter 24 reduces the Doppler restriction associated with present PRN radar altimeters.

Capabilities which allow random phase modulation of radar altimeter signals provide infinite phase resolution and no modulation code repeat intervals which heretofore have not been previously attained in radar altimeters. The above described improvements over known bi-phase modulation techniques (e.g., PRN modulation) allows radar altimeters to provide the above described improved capabilities without addition of costly and complex circuitry.

While the invention has been described in terms of various specific embodiments, those skilled in the art will recognize that the invention can be practiced with modification within the spirit and scope of the claims.

What is claimed is:

1. A method for randomly phase modulating a radar altimeter, said method comprising:
    a) momentarily applying a signal from a random noise source to an input of an amplifier;
    b) applying an output of the amplifier, the output based on the random noise input, to a voltage controlled oscillator;
    c) applying an output of the voltage controlled oscillator to a transmitter and mixer of the radar altimeter to modulate transmissions of the radar altimeter and to demodulate reflected radar transmissions received by the radar altimeter;
    d) holding the output of the amplifier constant from before a radar altimeter transmission until after reception of the reflected radar signals from that transmission by the radar altimeter; and
    e) repeating steps a), b), and d).

2. A method according to claim 1 wherein momentarily applying a signal from a random noise source comprises closing, then opening a switch located between the random noise source and the amplifier.

3. A method according to claim 2 wherein holding the output of the amplifier constant comprises keeping the switch open from the beginning of the radar altimeter transmission until the reflected radar signals from that transmission are received by the radar altimeter.

4. A method according to claim 1 further comprising filtering the signal from the random noise source to control a frequency spectrum of the random noise.

5. A method according to claim 1 further comprising filtering the output of the amplifier.

6. A method according to claim 1 wherein holding the output of the amplifier constant comprises utilizing a capacitor between an input of the amplifier and a ground of the radar altimeter to hold the voltage substantially constant at the input of the amplifier.

7. A method according to claim 1 wherein holding the output of the amplifier constant comprises adjusting a band-pass filter between the random noise source and the amplifier to provide a substantially constant phase during the time from a beginning of the radar altimeter transmission until the reflected radar signals from that transmission are received by the radar altimeter.

8. A method for randomly phase modulating a radar altimeter, the radar altimeter including a voltage controlled oscillator having an output which modulates transmissions of the radar altimeter and demodulates reflected radar transmissions received by the radar altimeter, said method comprising:
    configuring the voltage controlled oscillator to provide a random phase modulation source; and
    holding the phase of the modulation source substantially constant from a time when the radar altimeter transmits a radar signal until a time when a reflection of the transmitted radar signal is received by the radar altimeter.

9. A method according to claim 8 wherein configuring the voltage controlled oscillator to provide a random phase modulation source comprises utilizing thermal noise within an amplifier of the voltage controlled oscillator to determine a phase of the modulation source.

10. A method according to claim 9 wherein utilizing thermal noise within an amplifier of the voltage controlled oscillator to determine a phase of the modulation source comprises:
  removing DC power from the voltage controlled oscillator for a time sufficient enough for an output signal of the voltage controlled oscillator to decay; and
  restoring DC power to the voltage controlled oscillator.

11. A method according to claim 9 wherein utilizing thermal noise within an amplifier of the voltage controlled oscillator to determine a phase of the modulation source comprises biasing the amplifier within the voltage controlled oscillator to an OFF condition after receiving the reflection of the transmitted radar signal.

12. A method according to claim 8 wherein configuring the voltage controlled oscillator to provide a random phase modulation source comprises applying an impulse voltage to one of an amplifier in the voltage controlled oscillator and a frequency determining circuit within the voltage controlled oscillator, the impulse voltage timing being random with respect to a phase of the modulation source.

13. A radar altimeter comprising:
  a voltage controlled oscillator for modulating transmissions of said radar altimeter and demodulating reflected radar transmissions received by said radar altimeter;
  a random noise source;
  a holding circuit configured to sample a voltage from said random noise source and hold the voltage constant at an input to said voltage controlled oscillator from the time a signal is transmitted by said radar altimeter until a reflected radar return signal is demodulated by said radar altimeter.

14. A radar altimeter according to claim 13 wherein said random noise source comprises at least one of a noise diode connected to an input of an amplifier, and a resistor connected to an input of an amplifier, the amplifier having a gain in excess of 1000.

15. A radar altimeter according to claim 13 further comprising a band pass filter connected between said random noise source and said holding circuit, said band pass filter controlling a frequency spectrum of the random noise from said random noise source.

16. A radar altimeter according to claim 13 wherein said holding circuit comprises:
  an amplifier comprising an input and an output, said output connected to an input of said voltage controlled oscillator; and
  a switch connected between said input of said amplifier and said random noise source, said switch configured to be open from the time a signal is transmitted by said radar altimeter until a reflected radar return signal is demodulated by said radar altimeter.

17. A radar altimeter according to claim 16 further comprising a capacitor connected from an input of said amplifier to a ground of said radar altimeter, said capacitor holding a voltage substantially constant at said input of said amplifier when said switch is open.

18. A radar altimeter comprising a voltage controlled oscillator for modulating transmissions of said radar altimeter and demodulating reflected radar transmissions received by said radar altimeter, said voltage controlled oscillator configured to randomly phase modulate the transmissions of said radar altimeter, said voltage controlled oscillator comprising an amplifier therein.

19. A radar altimeter according to claim 18 wherein to randomly modulate the transmissions, said radar altimeter is configured to:
  remove DC power from said voltage controlled oscillator after a reflected radar transmission is received by said radar altimeter;
  allow sufficient time for an output signal from said voltage controlled oscillator to decay; and
  reapply power to said voltage controlled oscillator in time to modulate the next radar transmission, the random phase of the modulation being determined by thermal noise generated in said amplifier of said voltage controlled oscillator.

20. A radar altimeter according to claim 18 wherein to randomly modulate the transmissions, said radar altimeter is configured to:
  bias said amplifier in said voltage controlled oscillator to an OFF condition after a reflected radar transmission is received by said radar altimeter;
  allow sufficient time for an output signal from said voltage controlled oscillator to decay; and
  bias said amplifier in said voltage controlled oscillator to an ON condition in time to modulate the next radar transmission, the random phase of the modulation being determined by thermal noise generated in said amplifier of said voltage controlled oscillator.

21. A radar altimeter according to claim 18 wherein said voltage controlled oscillator further comprises a frequency determining circuit, wherein to randomly modulate the transmissions, said radar altimeter is configured to apply an impulse voltage to one of said amplifier and said frequency determining circuit within said voltage controlled oscillator, the impulse voltage timing being random with respect to a phase of an output of said voltage controlled oscillator.

22. A circuit for randomly phase modulating transmissions of a radar altimeter and demodulating reflected radar transmissions received by the radar altimeter, the radar altimeter including a voltage controlled oscillator, said circuit connected to an input of the voltage controlled oscillator, said circuit comprising:
  a random noise source;
  an amplifier comprising an input and further comprising an output connected to the voltage controlled oscillator; and
  a switch, said switch between said random noise source and said input of said amplifier, said switch configured to be open from the time a signal is transmitted by the radar altimeter until a reflected radar return signal is demodulated by the radar altimeter.

23. A circuit according to claim 22 further comprising a capacitor connected from an input of said amplifier to a ground of said radar altimeter, said capacitor holding a voltage substantially constant at said input of said amplifier when said switch is open.

24. A radar altimeter according to claim 22 wherein said random noise source comprises at least one of a noise diode connected to an input of an amplifier, and a resistor connected to an input of an amplifier having a gain in excess of 1000.

25. A radar altimeter according to claim 22 further comprising a band pass filter connected between said random noise source and said amplifier, said band pass filter controlling a frequency spectrum of the random noise from said random noise source.

* * * * *